United States Patent [19]

McWhortor

[11] Patent Number: 5,371,798
[45] Date of Patent: Dec. 6, 1994

[54] SYSTEM AND METHOD FOR ENHANCING DETECTION OF COUNTERFEIT FINANCIAL TRANSACTION DOCUMENTS

[76] Inventor: William F. McWhortor, 15928 E. Ocotillo, Fountain Hills, Ariz. 85268

[21] Appl. No.: 20,710

[22] Filed: Feb. 22, 1993

[51] Int. Cl.⁵ .................... G09C 3/08; H04L 9/00; H04L 15/34; B42D 15/00
[52] U.S. Cl. ........................ 380/51; 283/72; 283/73; 283/82; 380/55
[58] Field of Search .............. 380/55, 51; 283/72, 283/73, 82

[56] References Cited

U.S. PATENT DOCUMENTS

| | | |
|---|---|---|
| 3,108,824 | 10/1963 | Fischer . |
| 3,599,153 | 9/1971 | Lewis . |
| 4,175,776 | 11/1979 | Ranauro . |
| 4,231,593 | 11/1980 | Bell . |
| 4,455,039 | 10/1984 | Weitzen . |
| 4,791,281 | 12/1988 | Johnsen et al. ............ 283/56 |
| 4,977,040 | 12/1990 | Yano . |
| 5,044,668 | 9/1991 | Wright . |
| 5,190,318 | 3/1993 | Mantegazza ............ 283/82 |

*Primary Examiner*—Stephen C. Buczinski
*Attorney, Agent, or Firm*—LaValle D. Ptak

[57] ABSTRACT

A financial transaction document, such as a check, is manufactured by dividing the clear band of the document into two parallel portions. The first portion is printed with ferrous loaded ink to produce the standard MICE encoded financial information currently employed in such transaction documents. The second band, located either directly above or directly below the first band, has symbols printed with non-ferrous inks in specific locations. A system is employed to read the information in both bands, and to differentiate between properly printed documents, using the ferrous and non-ferrous printing in adjacent bands, from improperly printed documents which do not employ this printing technique.

14 Claims, 5 Drawing Sheets

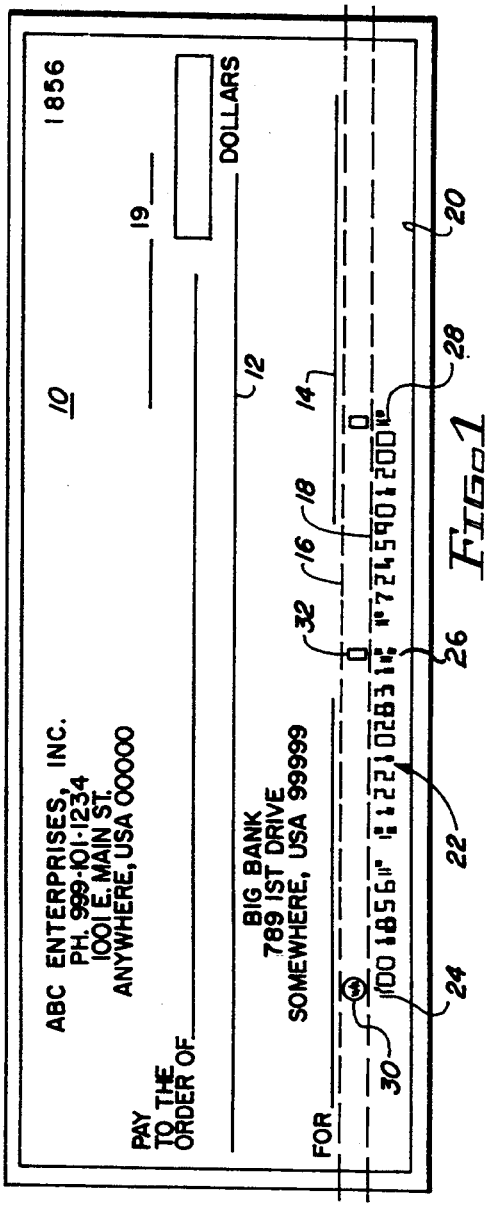
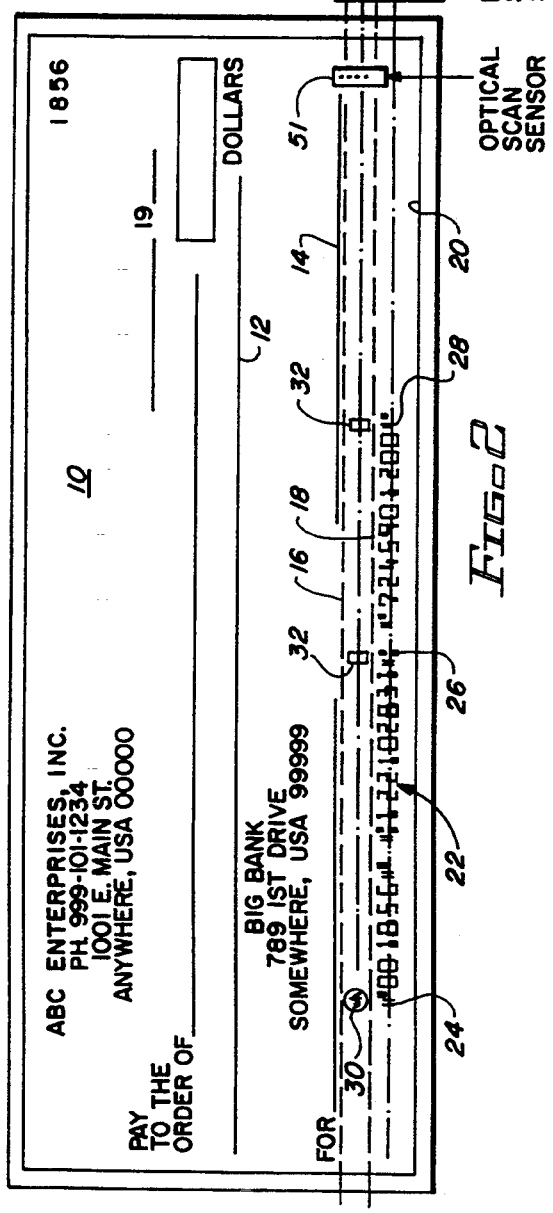

SYSTEM AND METHOD FOR ENHANCING DETECTION OF COUNTERFEIT FINANCIAL TRANSACTION DOCUMENTS

BACKGROUND

In the United States, approximately thirty-five years ago, Congress, the Treasury Department and the banking industry established a set of rules and procedures for the processing of checks and financial transaction documents, which made it easier to process these documents automatically with a high degree of accuracy. Steps also were taken to decrease the potential counterfeiting of such transaction documents by requiring key data to be encrypted with magnetic ink. As a result, the check and financial transaction industry has developed into a multi-billion dollar industry, with most of the error-prone manual check processing minimized through automation. In addition, counterfeiting also was limited to acceptable levels. A key factor, which permitted this automation and counterfeiting inhibition to occur, is the use of Magnetic Ink Character Recognition (MICR) symbology, accompanied with various forms of quality control operations at the banks and at the financial printing companies.

Once MICR encoded checks became widely available, increased speed and accuracy of check processing and proofing equipment minimized the rate of errors with good quality documents. At the same time, the rate of growth of check processing personnel has been smaller than the rate of growth of check usage.

Recently, advanced check printing technology for printing the MICR symbols has been developed. This new check production capability is widely available, and has been placed in the hands of operators with less skill than the older technologies. The result is that quality control of MICR check documents has suffered. More significantly, however, this technology is now so common that counterfeiters have been producing checks which pass the ANSI (American National Standards Institute) MICR signal level and format standards. This causes the detection of counterfeit checks printed with this technology to occur at a much later point in the transaction processing cycle, and, therefore, makes it more difficult to prevent monetary losses from occurring as a result of such counterfeit checks.

Essentially, five techniques have been used, or have been proposed, to inhibit counterfeiting of checks. The first of these techniques is to impregnate a pattern into the document paper which is translucent. When this pattern then is exposed with a high-energy light during a copying process, the pattern is revealed (usually the word "VOID") in the copied document. The pattern, however, does not disturb the original. A variation of this approach is a film coating the document. Another technique is to print a photograph of the payee into the non-clear band portions of a MICR document. A third technique, which has been proposed is to print, in the non-clear band area of a MICR document, a special symbol with irradiated inks tuned to a special frequency, which then can be detected with a receiver tuned to that special frequency. A variation of this approach is a foil stamping embossed on the document. Another proposal is to print a magnetic stripe in the middle of each MICR guaranteed payment document, which allows the encryption of MICR data in duplicate, but in magnetic strife read format (that is, credit card format). A fifth proposal is to use microprinted lettering as a border of parts of the document.

Both of the first two techniques have limited applications, and can be circumvented easily by existing technology and fraud practices. The latter three techniques, the special symbol, the magnetic strife, and microprinting, do provide the potential of raising the skill level and equipment required for counterfeiting. To be effective, however, these latter three techniques also require immediate substantial modification of presently installed MICR document processing equipment, and substantial changes in current MICR document printing equipment. The irradiated ink technique, to be effective, also requires stringent controls on the distribution and control of the irradiated inks used. Availability of these inks would invalidate the counterfeit-inhibiting capability. None of the five techniques provide visual plus automatic scan and audit trail features.

In an effort to reduce the incidence of false reads in MICR document processing in the financial transaction network, ANSI (American National Standards Institute) has assigned two digit spaces within the MICR line for use as self-check digits for two fields. Each field uses a different error checking method; and the choice of method on one field is at the discretion of the issuing financial institution. However, the ANSI and American Bankers Association (AEA) approved approach does not inhibit counterfeiting, since a copy of such a check easily can be printed to allow it to be accepted at the point of transaction. Therefore, such a counterfeit check will pass through the financial transaction network successfully. The ANSI standards and banking procedures allow documents failing to pass the error digit check to be corrected with a repair strip glued to the bottom of the document, or else inserted into an envelope with corrected information. Then either of the two corrections can be processed through the balance of the network. However, there is no method now, nor previously proposed, for the financial network which allows for the differentiation of valid and counterfeited MICR documents during the document processing cycle.

Some MICR document processors have been developed which read the same MICR line of symbols with both a magnetic scanner and an optical scanner. The character recognition results of the outputs of the two scanners then are compared in order to reduce the number of false reads. This approach, however, is incapable of discriminating between two sets of MICR symbol lines, and, therefore, cannot discriminate between valid and counterfeit MICR documents.

The patent to Ranauto U.S. Pat. No. 4,175,776 is directed to another somewhat different attempt at printing a check document which is difficult to counterfeit. The check disclosed in the Ranauro patent is printed with two different types of ink particles. The particles are selected to produce significantly different optical reflectivities for detection by the human eye. In addition, the reflectivities cause erroneous copying by a copy machine to inhibit counterfeiting of the document by means of copy machine reproduction.

The patent to Fischer U.S. Pat. No. 3,108,824 is directed to a technique using a mixture of standard four-color inks and magnetic ink in the printing of colored advertising coupons. The patent, however, is directed at automating coupon processing, and does not provide anti-counterfeiting techniques.

It is desirable to provide an improved document and processing system for transaction documents, such as checks, which incorporates the standardized MICR encoding, which overcome the disadvantages of the prior art, which significantly inhibits counterfeiting, and which can be used in conjunction with presently installed MICR recognition equipment and point-of-transaction equipment, with relatively minor modification.

SUMMARY OF THE INVENTION

It is an object of this invention to provide an improved counterfeit-resistant financial transaction document.

It is another object of this invention to provide an improved financial transaction document employing different printing processes in predetermined areas of the document for the purpose of reducing counterfeit documents.

It is an additional object of this invention to provide an improved apparatus for identifying potential counterfeit transaction documents.

It is a further object of this invention to provide an improved method for detecting potential counterfeit transaction documents.

It is yet another object of this invention to provide a system for identifying potential counterfeit financial transaction documents where symbols in a predetermined area of the document are printed with magnetic ink; and symbols in another predetermined area of the document are printed with non-magnetic ink.

It is still an additional object of this invention to provide an improved method for preparing financial transaction documents and for differentiating valid documents from counterfeit documents.

In accordance with a preferred embodiment of this invention, a transaction document, such as a check or the like, has first and second clear areas on it in pre-established locations. Symbols are printed in the first clear area by a first printing process; and symbols are printed in the second clear area by a second printing process; so that the characteristics of the symbols in the two clear areas differ from one another. Transaction documents prepared in this manner then are processed by a system responsive to information printed in both the first and second clear areas on the transaction document to provide information, which is used to determine whether the transaction document is a potential counterfeit document.

BRIEF DESCRIPTION OF THE DRAWINGS

FIG. 1 is a representation of a financial transaction document in accordance with a preferred embodiment of the invention;

FIG. 2 is a diagrammatic representation of equipment sensors used in conjunction with the document of FIG. 1 for processing such document;

DETAILED DESCRIPTION

Reference now should be made to the drawings, in which the same reference numbers designate the same components in the different figures.

Figure 6:
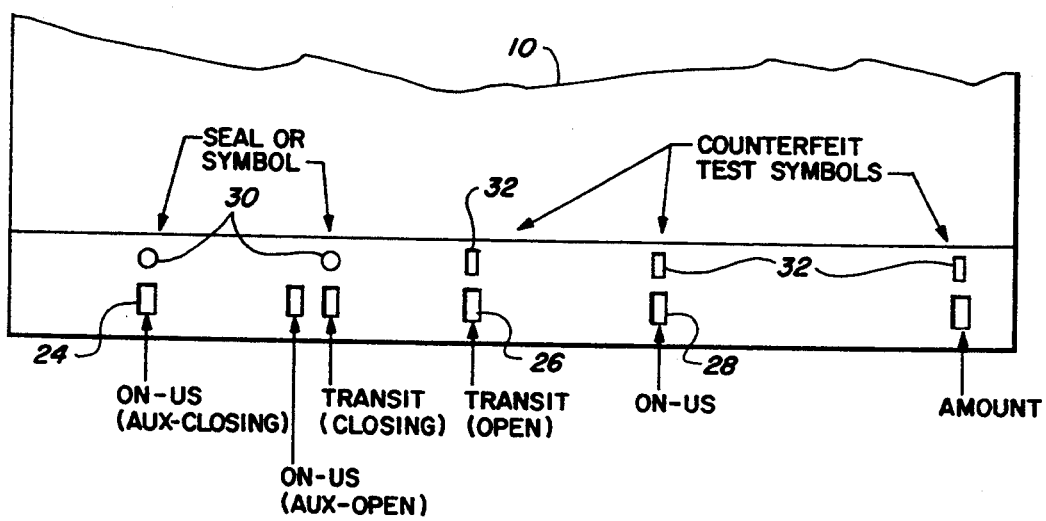
FIG. 6 is a representation of symbols used in the transaction document of FIGS. 1 and 2 for explaining the function of the document and the transaction process employed with the system of FIG. 3.

FIG. 1 is a representation of a typical financial transaction document, such as a personal or business check 10. Much of the information which is shown on the check 10 of FIG. 1 is readily recognizable, and is common to most checks or financial transaction documents printed today. There is a dollar amount line 12, and near the lower portion of the check is a signature line 14. Below the signature line 14, the standards established by ANSI designate a "clear band" to the bottom border 20 of the check. At the present time, this clear band has MICR characters 22 printed in magnetic ink in defined fields for identifying the issuing bank, account number, and other information. In addition, special symbols for use during the document processing cycle, such as the symbols 24, 26 and 28, are utilized to designate specific processing operations. These symbols, and others which are not specifically identified with reference numbers in FIGS. 1 and 2, are indicated in the diagrammatic representation of this portion of the check in FIG. 6. In addition to the information which is printed on the blank checks shown in FIGS. 1 and 2, at an early stage in the transaction processing, the dollar amount which is written on the check is entered in MICR characters to the right of the MICR information shown on the blank checks of FIGS. 1 and 2.

The MICR characters 22 and the special symbols 24, 26 and 28 are printed in the original production of the check blanks to have a specific size and quantity of magnetic particles. Thus, if the magnetic content is either greater than or less than an established range, the check is presumed to be potentially counterfeit, and is rejected during the document processing cycle.

In standard processing equipment, reduction in the incidence of false reads of the MICR strip is accomplished by the specific assignment of two digit spaces within the MICR line to be used as self-check digits for two fields of the MICR line. Each field uses a different error checking method; and the choice of the method on one field is at the discretion of the issuing financial institution. Even the addition of these self-check digits, however, does not inhibit counterfeiting. The technologies used for magnetic ink printing are presently widely available; so that counterfeit checks can be printed which will pass through the MICR document processing equipment as readily as valid MICR documents.

To reduce the relative ease with which a standard MICR encoded document can be counterfeited, the document explained up to this point in conjunction with FIGS. 1 and 2, has been modified to add additional information in the clear band between the signature line 14 and the lower border of the check 20. As is readily apparent from an examination of the typical documents of FIGS. 1 and 2, the MICR encoded line 22 does not occupy the entire clear space between the signature line 14 and the border 20. Both directly above and below the MICR encoded line 22, there is additional clear space or elongated clear bands paralleling the clear band in which the MICR information 22 is printed.

As illustrated in FIG. 1, the clear band above the MICR line 22 is shown between a pair of dotted parallel horizontal lines 16 and 18. These lines do not actually appear on the check. In the region between the lines 16 and 18, however, additional nonmagnetic or non-MICR ink patterns, comprising characters 30 and 32, are printed. Characters 30 and 32 may be printed with the same type of ink used to print other information (with the exception of the MICR line 22) on the check; but the important distinction between the symbols 30 and 32 and the MICR symbols 22 is that the symbols 30 and 32 in the upper clear band between the lines 16 and 18 are printed in non-magnetic ink. In its simplest form, the ink used for the characters 30 and 32, as well as for the MICR characters 22, may be black ink. It is possible, however, to use dark colors other than black for the characters 30 and 32, such as red, blue or green, to further inhibit counterfeiting.

As illustrated in FIGS. 1 and 2, the non-magnetic ink symbols or special characters 30 and 32 ideally are framed directly above the special MICR characters, such as 24, 26 and 28, which designate different fields of the information in the MICR clear band, namely "on-us", "transit", and "amount". This symbol designation is shown most clearly in FIG. 6.

For the special symbols 30 and 32, a single digit self-checking error digit, using an error checking algorithm, determined and controlled by the issuing financial institution, may be printed. This error checking digit is unique to the data in the MICR line of the document, and is controlled by the issuing financial institution, which releases the necessary algorithms for calculation of the digit only to those with a need to know in order to manufacture and process the document. Alternatively, or in addition to this special character, the symbol 30 printed with non-ferrous ink on the left side of and within the clear band between the lines 16 and 18, typically located above either the closing "on-us" or the closing "transit" MICR symbols, may be used to flag users of the document including this additional information in the clear band that the document is an authorized version. Consequently, if the symbols 30 or 32 are printed improperly or are printed with ferrous inks, the document 10 immediately will be rejected during the check processing cycle.

One technique which may be used to process the check shown in FIGS. 1 and 2 is to employ two different scanning sensors for processing information in the MICR strip 22 and in the non-ferrous printed strip including the characters 30 and 32. The first sensor is a standard MICR scan sensor 41, illustrated diagrammatically in FIG. 2. The magnetic scan sensor 41 and the document 10 are moved transversely, relative to one another. This caused the line including the MICR characters 22, 24, 26 and 28, along with the line including the non-ferrous characters 30 and 32, to pass beneath the magnetic scan sensor 41, which provides an output reading for both of these lines. Simultaneously with the reading of the magnetic scan sensor 41, an optical scan sensor 51 reads only the information in the band between the lines 16 and 18, namely the band in which the non-ferrous symbols or characters 30 and 32 are printed. If the characters 30 and 32 are printed in non-ferrous ink, an output is obtained from the optical scan sensor 51 for these characters; but the scan sensor 41 will not produce any output for the characters between the lines 16 and 18 under this condition of operation. If, however, the characters 30 and 32 are printed in ferrous ink, both the magnetic sensor 41 and the optical sensor 51 will respond to the characters 30 and 32. Consequently, this information may be used in a processing system to identify potentially counterfeit documents, since a valid document does not produce any output from the magnetic scan sensor 41 as a result of the characters or symbols 30 and 32 in the clear band between lines 16 and 18.

FIG. 1 is a block diagram of a typical MICR processing system which has been modified to add the optical document scanner 51 shown in FIG. 2, and to utilize the combined information from the magnetic document scanner 41 and the output from the optical document scanner 51 to identify potential counterfeit documents.

Figure 3:
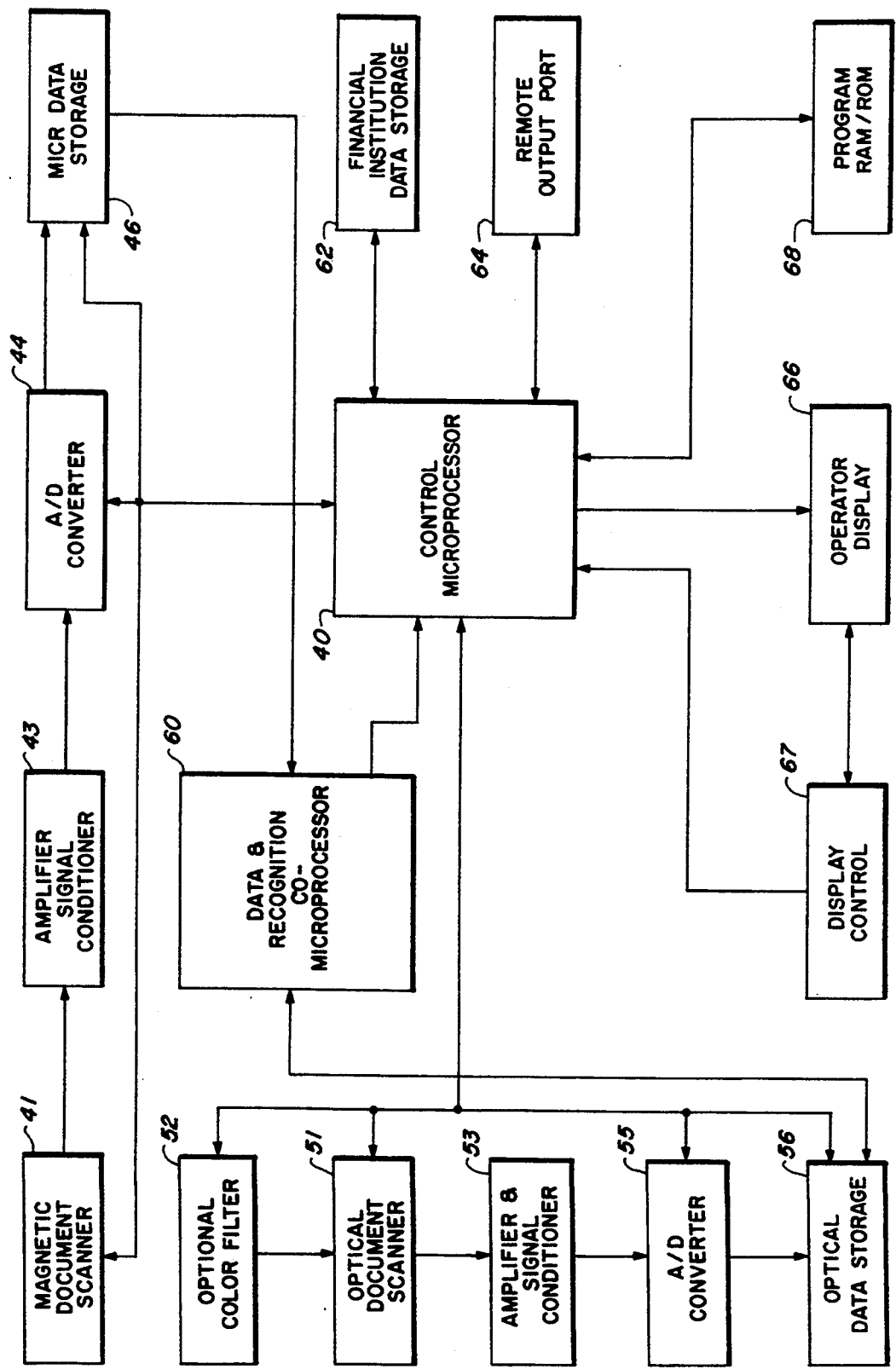
FIG. 3 is a block diagram of a system for processing documents of the type shown in FIGS. 1 and 2.

As illustrated in FIG. 3, a typical document processing system includes a control microprocessor 40 for processing the information read by the scanners in a conventional manner. A data and recognition co-microprocessor 60 typically is utilized in such a system to supply information to the main control microprocessor 40. The magnetic document scanner 41, which is used to scan the MICR encoded information, provides output signals to an amplifier signal conditioner 43 and an analog to digital converter 44 for data storage in a MICR data storage memory 46. The output of the converter 44 also is supplied to the control microprocessor 40, which in turn synchronizes the operation of the scanner 41, the converter 44, and the data storage 46 with the operation of the microprocessor 40. In a conventional MICR document processing system, the control microprocessor 40 then utilizes the information stored solely in the MICR encoded line of the document to compare this information with information from the financial institution data storage 62, and to supply information from the microprocessor to a remote output port 64. The microprocessor 40 also supplies information to an operator display 66 and a display control 67, as well as interchanging information with a program RAM/ROM 68.

To the standard MICR check processing system described thus far in FIG. 3, the optical scanner 51 is used to produce additional inputs. If the ink which is used to print the optical characters 30 and 32 is black ink, the reading of the line in which these characters occurs is directly supplied to the optical document scanner 51, which may be of a conventional, readily available type. If the characters 30 and 32, however, are printed in dark colored inks other than black, an optional color filter 52 may be employed as a first level of screening or discrimination prior to sending signals to the document scanner 51. If the symbols are printed in the wrong color, no information will be supplied to the document scanner 51.

Similar to the system for the magnetic document scanner 41, the output of the optical document scanner 51 is supplied to an amplifier signal conditioner 53, which then supplies signals to an analog-to-digital converter 55. The signals are supplied from the converter 55 to an optical data storage 56, which supplies these signals to the data and recognition co-microprocessor 60 to which signals from the MICR data storage 46 also are supplied. Here a comparison between the information obtained from both the magnetic document scanner 41 and the optical document scanner 51 is processed to determine whether the check being processed is valid or potentially counterfeit. Comparators may be provided in the data and recognition co-microprocessor 60 to determine whether there is a reading of the characters or symbols 30 and 32 by both of the scanners 41 and 51. If so, information is supplied from the data and recognition co-microprocessor 60 to the control microprocessor 40 to "flag" the microprocessor 40 to reject the document as a counterfeit document. This is the simplest form in which the system operates.

If the optical document scanner 51 is used in a system in which the symbols 30, for example, are encoded with self-checking error digits based on an error-checking algorithm for the processing institution, that information is supplied to the data and recognition co-microprocessor 60 for comparison with the information read by the magnetic document scanner 41 to determine the validity or invalidity of the error-checking digit. Again, if correlation with the desired information of the financial institution's algorithm is not achieved, the data and recognition co-microprocessor 60 supplies a signal to the control microprocessor 40 to reject or eliminate the check as a potential counterfeit document.

A modification of the system shown in FIGS. 2 and 3 also may be utilized with the checks or financial transaction documents shown in FIGS. 1 and 2. This modification may eliminate the optical scanner 51, provided relatively rigid controls are made in the initial check printing operation for the quantity of magnetic particles in the special symbols (the ones shown in FIG. 6) in the MICR line, namely the symbols 24, 26, 28 and others which are not specifically identified by reference numbers. If the magnetic characteristics of these symbols are controlled within a relatively narrow range, the non-magnetic counterfeit test symbols 32, for example (FIG. 6), located directly above these symbols, will cause a magnetic document scanner 41 to provide a correct reading (within the desired range).

If, however, the test symbols 32 also are printed in magnetic ink (indicative of a counterfeit document) the magnetic content read by the magnetic document scanner 41 at the positions 24, 26 and 28, for example, will be significantly higher than the magnetic content for a valid document. When this occurs, the output of the magnetic document scanner 41 for those positions, may be compared with a reference in the data and recognition co-microprocessor 60 to cause an output signal to be supplied from the co-microprocessor 60 to the control microprocessor 40 to produce an output used to reject the document as a counterfeit document. For this approach to function properly, however, relatively tight quality control of documents printed by an authorized printer for the financial institution necessarily must exist. If it is not possible to maintain a relatively narrow range for the magnetic content of the MICR special characters, the combined magnetic document scanner 41 and optical document scanner 51 should be used.

Figure 4:
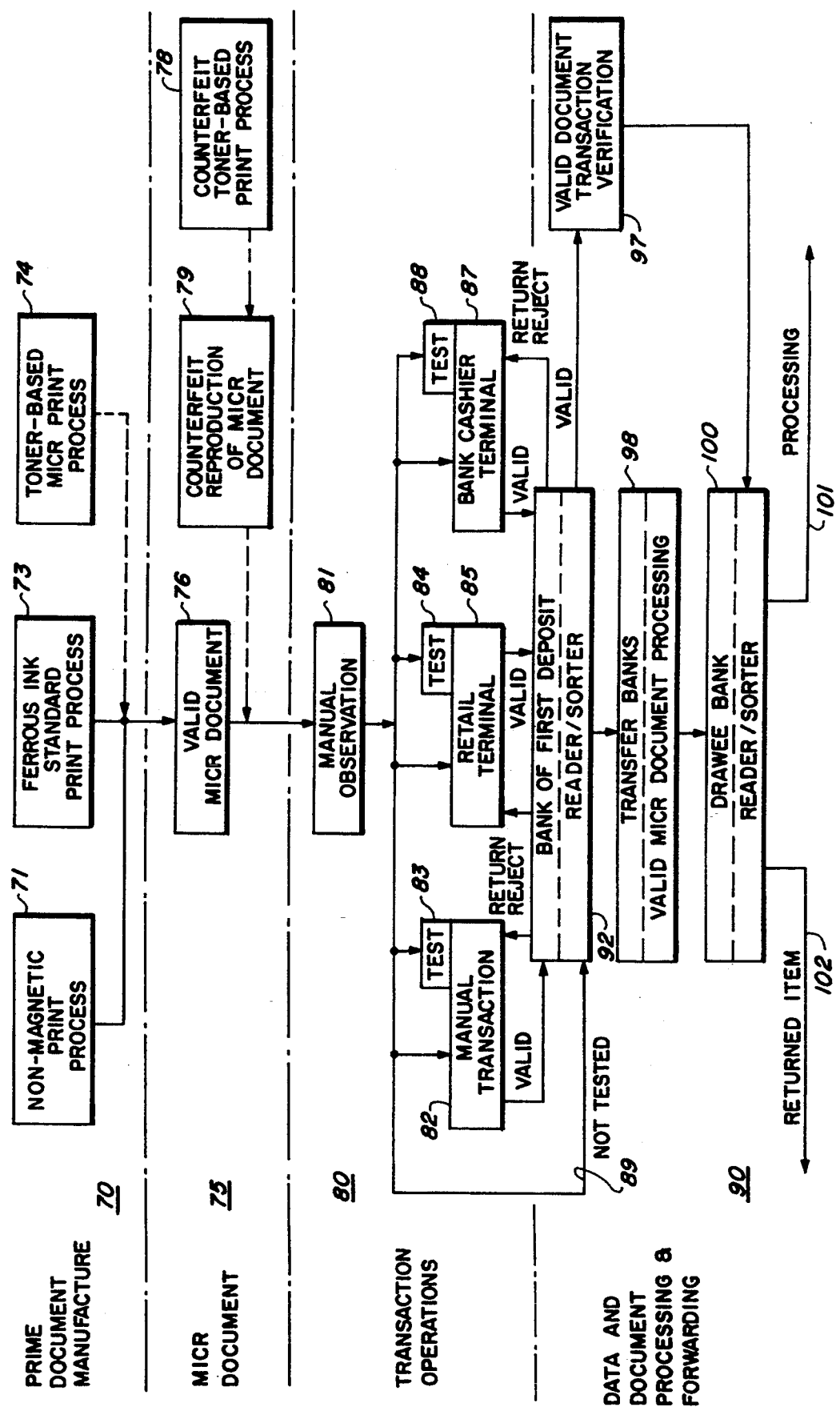
FIG. 4 is a flow chart of document production and transaction processing used to determine the validity of transaction documents.

Reference now should be made to FIG. 4 for a representation of a typical data and document processing and forwarding sequence. At the prime document manufacturer 70 the documents are printed. Valid documents, of the type shown in FIGS. 1 and 2, include a combination of a non-magnetic print process 71, and a ferrous standard ink process 73, to produce the two different clear bands between the lines 16 and 18 of FIGS. 1 and 2, and below the line 18, respectively. Also indicated in the document manufacture area 70, however, is a toner-based MICR print process 74, which is one present standard technique used to produce MICR documents. The output of the toner-based process 74 is indicated in dotted lines in FIG. 4.

Whatever process is used in the prime document manufacture, the result is to produce a MICR document 75. A valid MICR document 76 is shown on in FIG. 4. Counterfeit documents also may be produced by a toner-based print process 78 to produce a counterfeit MICR document 79.

Typically, in a transaction operation 80, the document initially is verified by means of a manual observation 81. After such a manual observation, typically three different types of transactions occur. The first of these is a manual transaction 82, which may have some test 83 to determine validity. If the test 83 is passed, the document is passed on as valid to the bank of first deposit 92. In many cases, there is no test or any verification through any automatic processing equipment following the initial manual observation; and the check is passed (via 89) untested to the bank of first deposit 92.

Often, a check is written at a retail store, and is supplied to a retail terminal 85. Again, the terminal 85 may be provided with equipment 84 to test the check to determine whether it appears valid. If it appears valid, it is passed to the bank of first deposit 92. Finally, the check may be presented to a bank cashier terminal 87. Again, the check may be tested at 88. If it is valid it is passed on to the bank of first deposit. If it is not, it is rejected or returned. All of this is indicated in FIG. 4.

Typically, after the initial transaction operation, the financial transaction documents or checks go through a data and document processing and forwarding operation. The bank of first deposit passes all checks which have been initially indicated as valid from its reader sorter to the transfer bank 98. Currently, this is the place at which valid MICR document processing usually takes place, using a system of the type shown in FIG. 3. If this is the first point at which equipment of the type shown in FIG. 3 and illustrated diagrammatically in FIG. 2 is used, it is possible for counterfeit checks to pass this far through the system before detection. At this point, however, if not before, the validity or invalidity of the document being processed is ascertained. If the document is valid, it is supplied to the drawee bank 100, and is processed by its reader sorter (as further processing as a 101 or returned item 102).

Figure 5A:
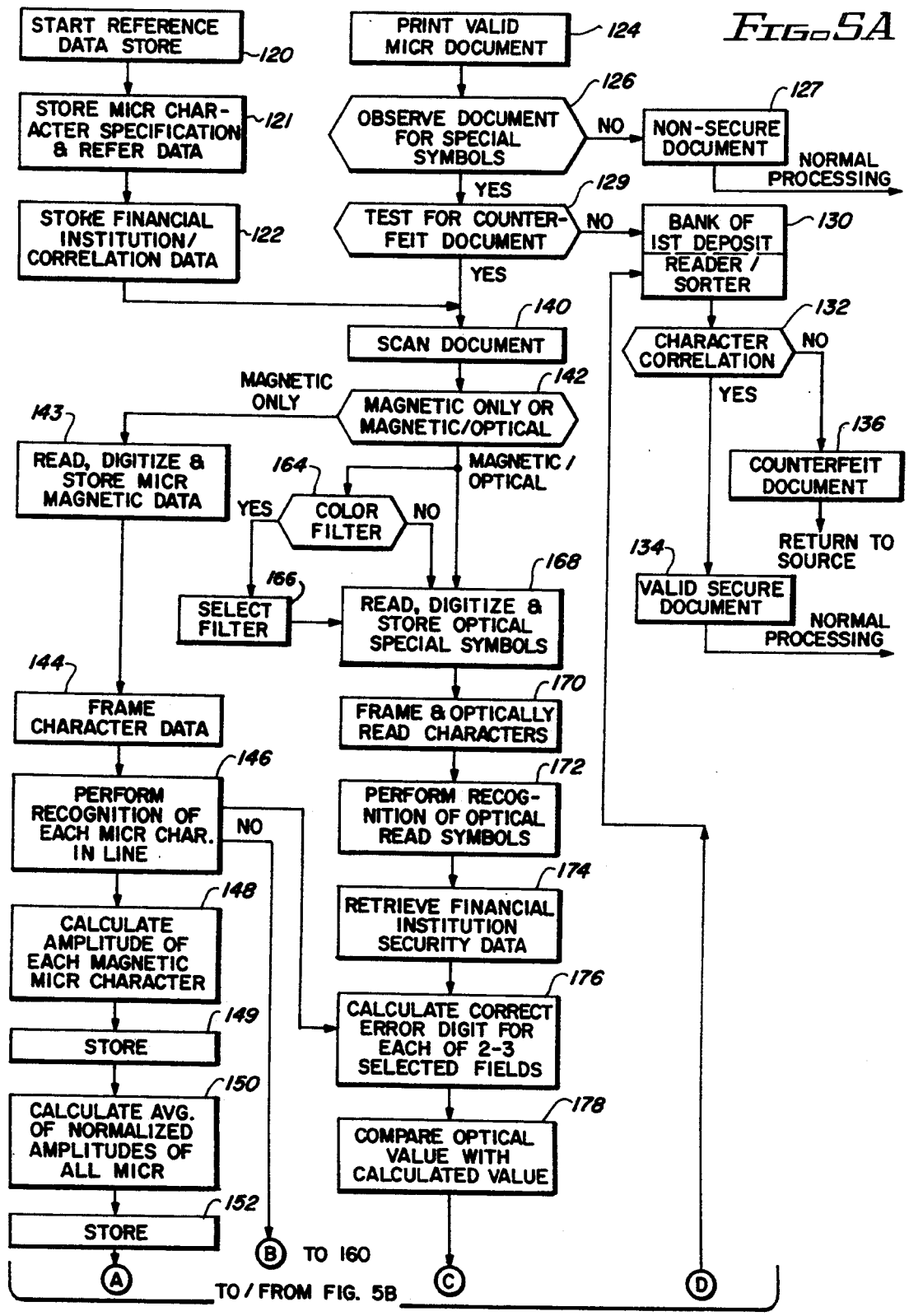
FIG. 5 is a flow chart of the processing steps employed in the system of the type shown in FIG. 3.
Figure 5B:
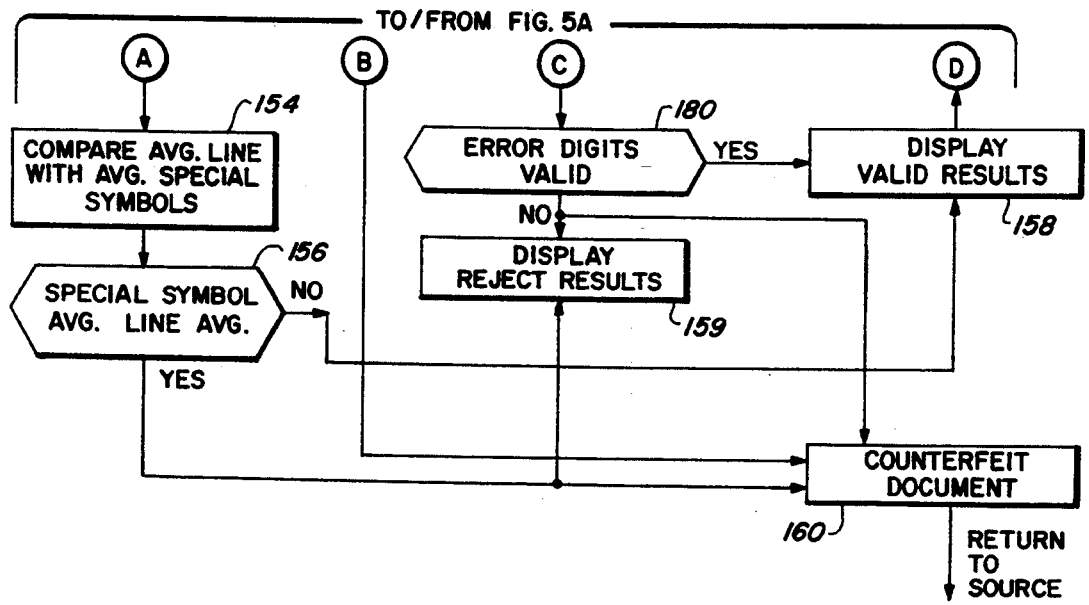

Reference now should be made to FIG. 5 (shown in two parts, 5A and 5B, which are interconnected together to form the complete figure). FIG. 5 is a flow chart of the operation of the system of FIG. 3 for the processing of documents to determine their validity or invalidity. As shown in FIG. 5, the first step is to print a valid MICR document 124; and this document then is observed at 126 to see whether it includes any special symbols. If it is a standard MICR document (not including the symbols 30 and 32 located above or below the MICR line 22) it is determined to be a non-secure document 127 and is passed through the system for normal processing. If the document, however, does have the special symbols which have been discussed above in conjunction with FIGS. 1 and 2, it may be tested to determine whether it is a counterfeit document at 129. If no test is made at 129, the document is supplied to the bank of first deposit 130, with the reader sorter at that bank then determining whether there is character correlation at 132. If not, the document is determined to be counterfeit at 136 and is returned to the source. If the correlation at 132 is correct, the document is determined to be a valid secure document 134 and is passed from the bank of first deposit 130 through for normal processing.

If at this initial stage (which could be a retail terminal or bank cashier terminal) a test for counterfeit document is to be made, the document is scanned at 140. This scanning is made in conjunction with starting reference data stored at 120, along with the MICR character specification and reference data 121 and the financial institution correlation data 122. All of this is utilized for scanning the document 140.

Next, one or the other of two systems described above for scanning the document, either as magnetic only or as magnetic/optical at 142, is made. If the document is to be scanned magnetically only, the information is digitized and stored at 143. Frame character data 144 is correlated, and then a recognition of each MICR character in the line 146 is made. Following that, a calculation of the amplitude of each magnetic MICR character 148 is made; and this information is stored at 149. From the storage 149, calculation of the average of normalized amplitudes of all of the MICR information 150 is made; and this is stored at 152. This information from storage 152 then is utilized to compare an average line magnitude of the MICR information with the average special symbols at 154.

If the special symbols average output is greater than the stored average line, this is indicative of a counterfeit document, since it is caused by the additional magnetic content of the symbols 30 and 32, for example. Another form of counterfeit detection is for the magnetic content of the special symbols 30 and 32 to interfere with the proper recognition of the symbols 24, 26 and 28. As a consequence, these determinations, made at 156 and/or 146, then is indicative of a counterfeit document 160, which then is to be returned to source. In addition, the reject results are displayed at 159. If the average special symbol signal applitude is not greater than the line average anticipated and symbol recognition is satisfactory, the output from 156 is supplied to display valid results 158 and sent through the bank of first deposit 130 for normal processing, as described previously.

If the information at 146 includes error digits, the information is supplied to 176 for calculation of the correct error digit for each of the two or three selected fields; and this value compares the optical value with the calculated value at 178 for a checking whether the error digits are valid at 180. If they are not valid, the output at 180 is supplied to determine a counterfeit document at 160, which then causes the document to be returned to its source. In addition, the display of the reject results is made at 159. If the error digits are valid, the display of valid results 158 is made, and the document is sent through to the bank of first deposit for final processing.

If at 142, the scanning is to be made both magnetically and optically, a determination first is made as to whether a color filter 164 is used or not. If it is not, the special optical signals are read, digitized and stored at 168. If a color filter is used, the filter is selected at 166 prior to the reading, digitizing and storage of the optical signals at 168. Following the storage of the optical signals, they are framed and optically read at 170, and recognition of the optical read symbols is performed at 172. The financial institution security data is retrieved at 174; and the calculation of the correct error digit for the field is done at 176. The operation of the comparison of the optical value of the calculated value 178 then is made, along with the error digit valid check at 180, as described previously. The operating sequence or method, which is described above in conjunction with FIG. 5, can be varied in accordance with different ones of the operations previously discussed. The sequence shown in FIG. 5, however, is typical for utilizing the information which is printed on the checks or transaction documents shown in FIGS. 1 and 2, in accordance with the preferred embodiment of the invention.

It should be noted that the foregoing description of the preferred embodiment of the invention may be implemented in different manners. For example, although the non-ferrous printing in the clear area or clear band of the document is shown located above the MICR characters, this non-ferrous printed band also may be located below the MICR characters if desired. The operation of the system will be the same, irrespective of the location of this information. It also should be noted that the system which has been shown and described can be incorporated into existing MICR check processing equipment with relatively minor modifications; so that equipment already used in the banking and financial transaction processing business need not be replaced.

The foregoing description of the preferred embodiment of the invention is to be considered as illustrative only, and not as limiting. Various changes and modifications will occur to those skilled in the art, without departing from the true scope of the invention as defined in the appended claims.

I claim:

1. A MICR encrypted transaction document having an ANSI standards MICR clear band on it, said document including in combination:
   first and second areas in the form of adjacent elongated first and second parallel strips both located in said MICR clear band;
   symbols printed with ferrous loaded ink in said first strip; and
   symbols printed with non-ferrous ink in said second strip.

2. The combination according to claim 1 wherein said transaction document has a bottom edge, and said first and second adjacent strips extend parallel to one another along the bottom edge of said document.

3. The combination according to claim 2 wherein said symbols printed in said second strip are located directly adjacent predetermined symbols in said first strip.

4. The combination according to claim 1 wherein said symbols printed in said second strip are located directly adjacent predetermined symbols in said first strip.

5. The combination according to claim 1 wherein said different physical characteristics of said symbols printed in said first and second areas are distinctively detectable by automated detection apparatus.

6. Apparatus for identifying a potential counterfeit transaction document having an ANSI standards MICR clear band in which the transaction document has information with different first and second recognizable printing characteristics, respectively, printed in first and second predetermined areas within the ANSI standards MICR clear band of the document, respectively, said system including in combination;
   first means for detecting and analyzing information printed in both of the first and second predetermined areas of the MICR clear band of said transaction document;
   second means for detecting and analyzing information printed only in one of said first and second predetermined areas of the MICR clear band of said transaction document, and for differentiating the printing characteristics used; and
   means responsive to said first and second detecting and analyzing means for determining whether said transaction document is a potential counterfeit document.

7. The combination according to claim 6 wherein said second detecting means is responsive only to information having said second characteristics, and is non-responsive to information having said first characteristics.

8. The combination according to claim 7 wherein said first detecting means responds to optical characteristics, and said second detecting means responds to magnetic characteristics of information printed in said predetermined areas.

9. The combination according to claim 8 wherein said transaction document has symbols printed in said first area using ferrous loaded ink, and symbols printed in said second area using non-ferrous ink.

10. The combination according to claim 6 wherein said transaction document has symbols printed in said first area using ferrous loaded ink, and symbols printed in said second area using non-ferrous ink.

11. The combination according to claim 10 wherein said first detecting means responds to optical characteristics, and said second detecting means responds to magnetic characteristics of information printed in said predetermined areas.

12. A method of detecting potential counterfeit transaction documents where valid documents are provided with adjacent bands of special symbols, with the symbols in one of said bands printed with ferrous loaded ink, and with the symbols in the adjacent band printed with non-ferrous ink, the method including the steps of:

detecting symbols printed in the first and second bands on the transaction document;

determining whether symbols printed in the first band are printed having distinguishing characteristics from symbols printed in the second band;

comparing the averages of the amplitudes of symbols printed in said first band with predetermined standards;

making a separate calculation of the averages of symbols in said first band which also have symbols located adjacent them in the second band; and comparing differences between the two calculated averages to determine a potential counterfeit document.

13. The method according to claim 12 wherein the transaction document is printed with a calculated secure self-checking error code of selected portions of the symbols printed in said first band; and said step of analyzing comprises comparing such calculated secure self-checking error code with a printed symbol in the second band representative of the correct calculated error code symbol in the manufacture of valid transaction documents to determine deviations from the correct symbol to identify potential counterfeit documents.

14. The method according to claim 12 wherein special MICR symbols are printed in the band printed with ferrous loaded ink and wherein the step of detecting symbols fails to detect said special symbols in the presence of adjacent improper magnetic symbols.

* * * * *